United States Patent [19]

Tanaka et al.

[11] Patent Number: 5,054,091
[45] Date of Patent: Oct. 1, 1991

[54] METHOD FOR DETERMINING COORDINATES OF CIRCUMSCRIBED RECTANGULAR FRAME OF EACH CHARACTER FOR USE IN OPTICAL CHARACTER READER

[75] Inventors: Hideaki Tanaka, Osaka; Toshiaki Morita, Nara; Yoshihiro Kitamura; Hitoshi Hirose, both of Osaka; Yasuhisa Nakamura, Kyoto; Hisashi Saiga, Osaka, all of Japan

[73] Assignee: Sharp Kabushiki Kaisha, Osaka, Japan

[21] Appl. No.: 510,895

[22] Filed: Apr. 18, 1990

[30] Foreign Application Priority Data

Apr. 18, 1989 [JP] Japan .................................. 1-99371

[51] Int. Cl.⁵ .............................................. G06K 9/36
[52] U.S. Cl. ........................................... 382/9; 382/48
[58] Field of Search .............................. 382/9, 48, 18

[56] References Cited

U.S. PATENT DOCUMENTS

| | | | |
|---|---|---|---|
| 3,930,228 | 12/1975 | Spanuersberg | 382/9 |
| 4,295,121 | 10/1981 | Enser et al. | 382/9 |
| 4,527,283 | 7/1985 | Ito et al. | 382/9 |
| 4,847,912 | 7/1989 | Tanaka et al. | 382/9 |
| 4,850,025 | 7/1989 | Abe | 382/9 |
| 4,903,311 | 2/1990 | Nakamura | 382/9 |

FOREIGN PATENT DOCUMENTS

| | | |
|---|---|---|
| 0054439 | 12/1981 | European Pat. Off. . |
| 55-13414 | 1/1980 | Japan . |
| 63-10282 | 1/1988 | Japan . |
| 61-248024 | 5/1988 | Japan . |
| 61-310411 | 7/1988 | Japan . |
| 62-129023 | 11/1988 | Japan . |
| 2217498 | 4/1988 | United Kingdom . |
| 2218839 | 5/1989 | United Kingdom . |
| 8600445 | 1/1986 | World Int. Prop. O. . |

Primary Examiner—Leo H. Boudreau

[57] ABSTRACT

A method determines coordinates of a circumscribed rectangular frame for enclosing each character based on image data of character images in a recognition area. First of all, specified image data of a predetermined data unit in a transverse direction including at least one bit of black pixel are determined by scanning the image data. Thereafter, top and bottom coordinates of a circumscribed rectangular frame are determined respectively by searching respective image data located at the top and bottom positions among plural image data including at least one bit of black pixel located on the upper and lower sides of the specified image data, wherein respective bits of black pixel of plural image data are substantially continuously connected in a longitudinal direction, and then, leftmost and rightmost coordinates of the circumscribed rectangular frame are determined based on histogram data composed of either logical products or logical sums of respective bits in the transverse direction.

4 Claims, 11 Drawing Sheets

Fig. 2

| | | | | | | | |
|---|---|---|---|---|---|---|---|
| 1 | 1 | 1 | 1 | 0 | 1 | 1 | 1 |
| 1 | 1 | 1 | 0 | 0 | 0 | 1 | 1 |
| 1 | 1 | 1 | 0 | 0 | 0 | 1 | 1 |
| 1 | 1 | 0 | 0 | 0 | 0 | 0 | 1 |
| 1 | 1 | 0 | 0 | 0 | 0 | 1 | 1 |
| 1 | 1 | 1 | 0 | 0 | 1 | 1 | 1 |
| 1 | 1 | 1 | 0 | 1 | 1 | 1 | 1 |
| 1 | 1 | 1 | 1 | 1 | 0 | 1 | 1 |

First specified data ( Top coordinate )
Second specified data
Third specified data
Fourth specified data
Fifth specified data
Sixth specified data
Seventh specified data (Bottom coordinate)
There is no connection relationship.

Fig. 3

\* Specified bit

| | | | | | | |
|---|---|---|---|---|---|---|
| 1 | 1 | 1 | 0 | 1 | 1 | 1 |
| 1 | 1 | 0 | 0 | 0 | 1 | 1 |
| 1 | 1 | 0 | 0 | 0 | 1 | 1 |
| 1 | 1 | 0 | 0 | 0 | 0 | 1 |
| 1 | 1 | 0 | 0 | 0 | 1 | 1 |
| 1 | 1 | 0 | 0 | 1 | 1 | 1 |
| 1 | 1 | 0 | 1 | 1 | 1 | 1 |

Data having a connection relationship in longitudinal direction

| 1 | 1 | 0 | 0 | 0 | 0 | 1 |

Histogram data representing logical products $x_{min}$ — \* — $x_{max}$
101      102

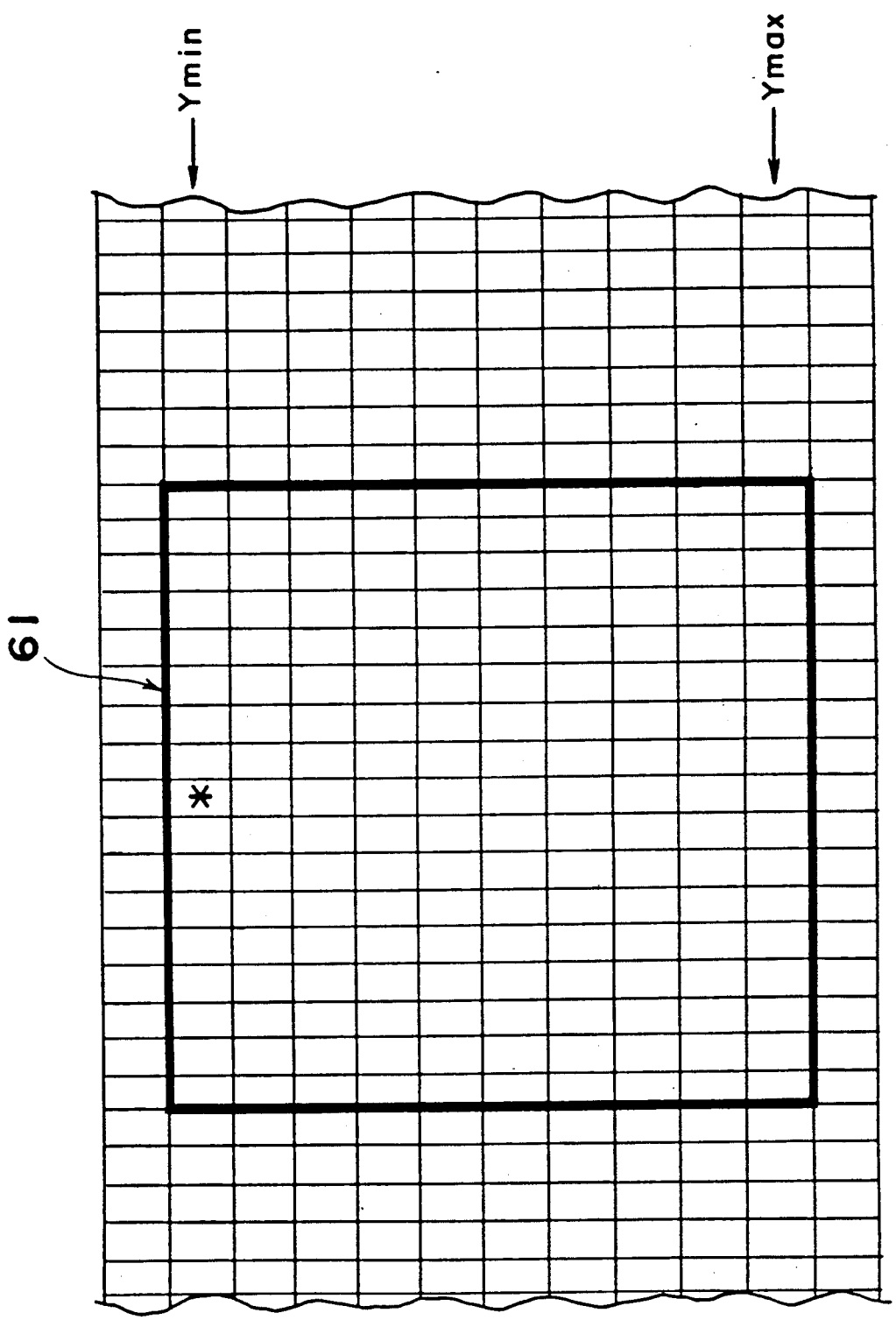

Fig. 10 e since 1963 sickly, but reluctant to meet General's
rs and the nor- demands. Mayfield's 1,400 hourly em-
companies are ployees worked without a contract for
monious rela- three months after their pact expired in
October. General stopped deducting
But Akron- dues from paychecks, forcing the union
Ben Co., which to accept a huge administrative burden
the contract and on Jan. 15 it stopped paying health
on, Firestone, insurance premiums. That weekend, in
ch, is not play- what the company contends were "mas-
ing to gain a sive acts of sabotage" by DRW members,
eneral its de- fire-curing and other equipment was
it already has damaged at the plant.
es from the A broken promise? The union has angrily
make General

METHOD FOR DETERMINING COORDINATES OF CIRCUMSCRIBED RECTANGULAR FRAME OF EACH CHARACTER FOR USE IN OPTICAL CHARACTER READER

BACKGROUND OF THE INVENTION

1. Field of the Invention

The present invention relates to a method for determining coordinates of a circumscribed rectangular frame of each character for use in an optical character reader, more particularly, to a method for determining coordinates of a circumscribed rectangular frame for enclosing each character upon processing character images in an optical character reader.

2. Description of Related Art

In a conventional optical character reader, in order to recognize characters which are typed along respective lines parallel to the horizontal direction in a recognition area, it is necessary to determine coordinates of a circumscribed rectangular frame for enclosing each character from binary image data read by an image scanner, and to determine respective lines of character images based on the determined coordinates of the circumscribed rectangular frames of respective characters. The circumscribed rectangular frame of each character has a longitudinal length and a transverse width which fall in predetermined ranges respectively, and is referred to as a character rectangle hereinafter.

As a method for determining the coordinates of the character rectangles from the binary image data, conventionally, there has been used a method for determining the coordinates thereof by scanning plural black pixels connected to each other (referred to connected components hereinafter) such as the CLAB algorithm (the algorithm for labeling the connected components of black pixels) which is provided in the Subroutine Package for Image Data Enhancement and Recognition (SPIDER) developed by the Nippon Kohgyo Gijutsuin.

However, in the conventional method for determining the coordinates of the character rectangles by scanning connected components of black pixels, there is such a problem that the processing time thereof is relatively long since it is necessary to judge whether or not there is a connected component to be connected to each black pixel.

In a conventional optical character reader, there has been used a method for determining character portions using the method for labeling the connected components of black pixels. In this case, in order to overcome the above-mentioned problem of the processing time, it has been considered that compressed image data are used and there is used a hard system provided for only the above-mentioned process. However, labeling the connected components of black pixels using the compressed image data leads to missing of information of the original image. Particularly, it may be difficult to correctly determine the character rectangles since it may be judged that a black pixel is connected to a character rectangle close thereto even though the black pixel is not connected thereto. Further, when there is used the hard system provided for only determining the character rectangles, there is such a problem that the cost of the whole system including the hard system becomes relatively high.

SUMMARY OF THE INVENTION

An essential object of the present invention is to provide a method for determining the coordinates of a circumscribed rectangular frame for enclosing each character for a shorter time using a general image processing apparatus, without the above-mentioned hard system provided only therefor.

In order to accomplish the above object, according to the present invention, there is provided a method for determining coordinates of a circumscribed rectangular frame for enclosing each character based on image data of character images in a recognition area having been read by an image scanner, including:

a first step of determining specified image data of a predetermined data unit in a transverse direction parallel to lines including at least one bit of black pixel by scanning said read image data, and for determining a specified bit being one bit of black pixel in said specified image data;

a second step for judging whether or not there is a bit of black pixel in either the bit located by one bit at the upper side of said specified bit of said specified image data which has been determined at said first step, or the bits located in said transverse direction by one bit of the bit located at the upper side by one bit of said specified bit of said specified image data;

a third step for determining the bit of black pixel as a newly specified bit if there is the bit of black pixel therein and for repeating said second step, otherwise the coordinate in the transverse direction of said specified bit of black pixel being determined as a top coordinate of said circumscribed rectangular frame;

a fourth step for judging whether or not there is a bit of black pixel in either the bit located by one bit at the lower side of said specified bit of said specified image data which has been determined at said first step, or the bits located in said transverse direction by one bit of the bit located at the lower side by one bit of said specified bit of said specified image data;

a fifth step for determining the bit of black pixel as a newly specified bit if there is the bit of black pixel therein and for repeating said fourth step, otherwise the coordinate in the transverse direction of said specified bit of black pixel being determined as a bottom coordinate of said circumscribed rectangular frame;

a sixth step of calculating histogram data composed of either logical products or logical sums of respective bits in said transverse direction from plural image data located in a specified area between said determined top and bottom coordinates in a predetermined threshold range in said transverse direction from the center of said specified image data which is equal to or larger than the maximum of the transverse width of each circumscribed rectangular frame;

a seventh step of determining a coordinate in said transverse direction of a bit of black pixel located at the leftmost position in said calculated histogram data as a leftmost coordinate of said circumscribed rectangular frame; and an eighth step of determining a coordinate in said transverse direction of a bit of black pixel located at the rightmost position in said calculated histogram data as a rightmost coordinate of said circumscribed rectangular frame.

Preferably, the above-mentioned method further includes a ninth step for judging said determined top and bottom coordinates and said determined leftmost and rightmost coordinates as coordinates of said circumscribed rectangular frame for enclosing each character when a difference between said determined top and bottom coordinates is equal to or smaller than a predetermined first threshold value and a difference between said determined leftmost and rightmost coordinates is equal to or smaller than a predetermined second threshold value after executing said eighth step.

More preferably, the above-mentioned method further includes:

a step of dividing said read image data into plural divided image data having a predetermined amount of data in said transverse direction so that said divided image data include image data overlapped with former divided image data adjacent thereto before executing said first step; and a step of erasing bits of black pixel in said image data located within said determined circumscribed rectangular frame so as to set them at white pixels after executing said ninth step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiment thereof with reference to the accompanying drawings which are given by way of illustration only, and thus are not limitative of the present invention, and in which:

FIG. 2 is a diagram showing a scan operation of a connection relationship of black pixels in a longitudinal direction in image data;

FIG. 3 is a diagram showing a scan operation of a connection relationship of black pixels in a transverse direction in the image data;

FIG. 7 is a schematic diagram showing an area of the image data for calculating histogram data;

FIG. 10 shows character rectangles determined by the method of the preferred embodiment.

DETAILED DESCRIPTION OF THE PREFERRED EMBODIMENT

An optical character reader 10 for recognizing characters using a method for determining coordinates of character rectangles of a preferred embodiment according to the present invention will be described below in an order of the following items with reference to the attached drawings:

(1) Composition of optical character reader;
(2) Fundamental operation of process for determining coordinates of character rectangles;
  (2-1) Connection table;
  (2-2) Scan process of connection relationship in longitudinal direction;
  (2-3) Scan process of connection relationship in transverse direction;
(3) Detailed description of process for determining coordinates of character rectangles;
  (3-1) Management of divided image buffer memory and scan process of specified image data;
  (3-2) Rectangle coordinate determining process The method for determining the coordinates of character rectangles of the present preferred embodiment is characterized in determining the coordinates of the character rectangles at a high speed by scanning connection relationships between black pixels in the longitudinal direction using a connection table representing the relationships between adjacent image data in the unit of one byte or eight bits and by scanning connection relationships between black pixels in the transverse direction using histogram data composed of logical products or logical sums of the image data in a partial portion of a recognition area.

On the other hand, in the optical character reader of the present preferred embodiment, lines of character images are determined in a manner known to those skilled in the art. Thereafter, respective characters of the character images are recognized based on the determined lines, and then, the recognized characters are displayed on the CRT display unit 40.

(1) Composition of optical character reader

Figure 1:
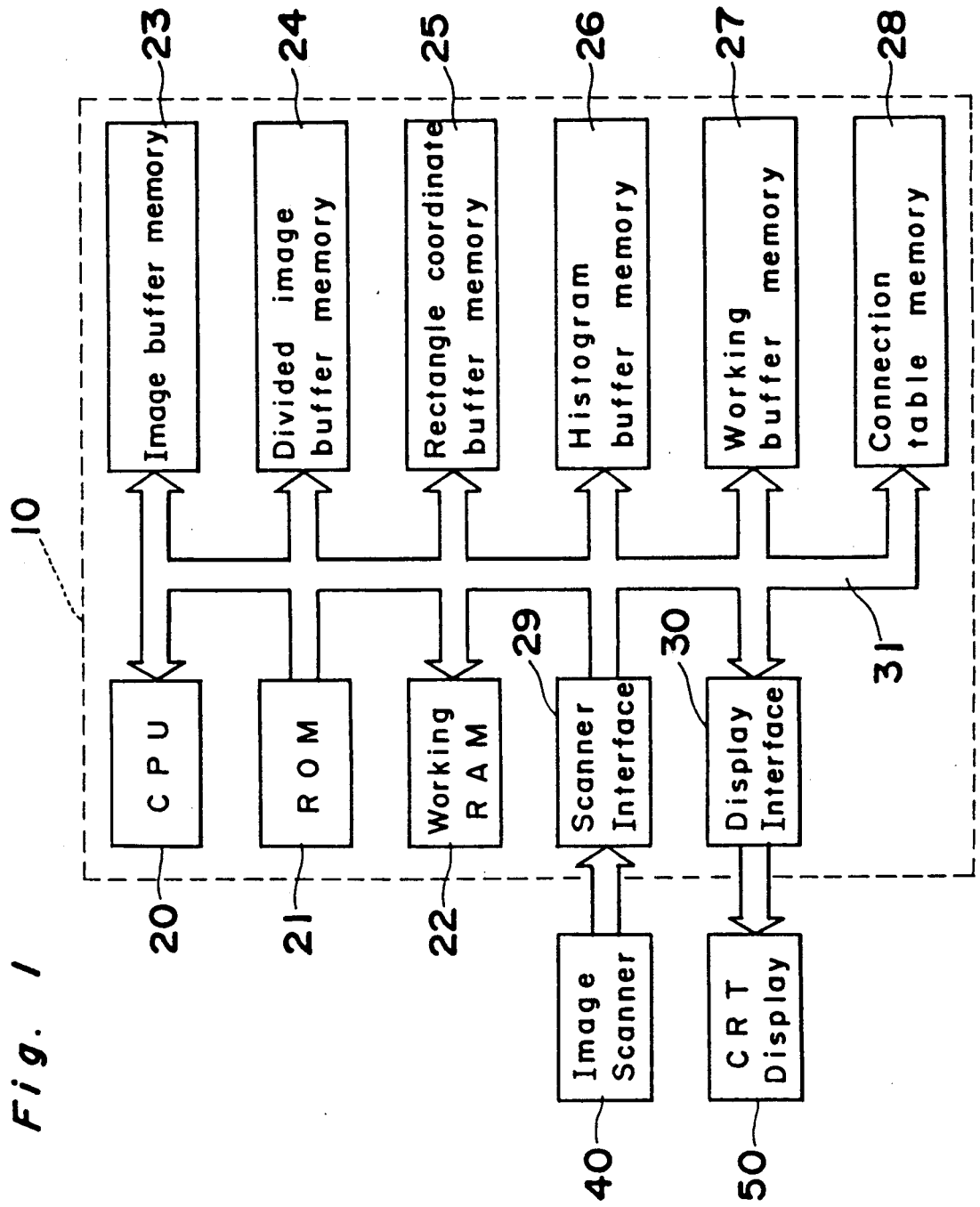
FIG. 1 is a block diagram showing an optical character reader of a preferred embodiment according to the present invention.

FIG. 1 shows the composition of the optical character reader 10 for recognizing character images in a recognition area after determining the coordinates of the character rectangles in the process of the preferred embodiment, and peripheral units thereof.

Referring to FIG. 1, the optical character reader 10 comprises a CPU 20 for controlling an image recognition process including the process for determining the coordinates of character rectangles, a ROM 21 for storing a system program comprising the image recognition process including the process for determining coordinates of character rectangles, a working RAM 22 for storing data required for executing the image recognition process, an image buffer memory 23 of a RAM for storing all the image data which have been read by an image scanner 40, a divided image buffer memory 24 of a RAM for storing divided image data, a rectangle coordinate buffer memory 25 of a RAM for storing determined coordinates of character rectangles, a histogram buffer memory 26 of a RAM for storing histogram data calculated as described in detail later, a working buffer memory 27 of a RAM for storing image data for working while executing the process for determining the coordinates of character rectangles, a connection table memory 28 of a RAM for storing the connection table, a scanner interface 29 connected to the image scanner 40 for reading character images and transforming them into image data, and a display interface 30 connected to a CRT display unit 50 for displaying recognized character images determined character rectangles, and determined lines thereof, which are connected through a bus 31.

(2) Fundamental operation of process for determining coordinates of character rectangles In order to briefly explain the fundamental operation of the process for determining the coordinates of character rectangles of the present preferred embodiment, it is assumed that each side of the character rectangles to be determined is not located on adjacent two image data of one byte, namely, each line of the character rectangles to be determined is located on only one image data of one byte.

(2-1) Connection table

A connection table is obtained by scanning image data and determining the connection relationship between adjacent two image data of one byte in the longitudinal direction. The connection relationship therebetween is defined as follows.

In the present preferred embodiment, a bit of zero of image data represents a black pixel, and a bit of one thereof represents a white pixel. The bit of zero is referred to as a black bit hereinafter, and the bit of one is referred to as a white bit hereinafter.

If there is a black bit of image data (referred to as adjacent image data hereinafter) of one byte adjacent in the longitudinal direction to specified image data of one byte in the range in the transverse direction from a bit located on the left side of a specified bit of a specified image data by one bit to a bit located on the right side thereof by one bit, it is defined that the above adjacent image data of one byte is connected to the specified image data of one byte, or there is a connection relationship between the specified image data of one byte and the above adjacent image data of one byte. Namely, if specified image data SD1 of one byte is "11110111", and adjacent image data AD1 of one byte is "11101111", it is defined that there is a connection relationship between the specified image data SD1 of one byte and the adjacent image data AD1 of one byte. On the other hand, for example, if the specified image data SD1 of one byte is "11110111", and adjacent image data AD2 of one byte is "10111101", it is defined that there is not any connection relationship between the specified image data SD1 of one byte and the adjacent image data AD2 of one byte. The above example represent such a case that there is only one black bit in the specified image data. On the other hand, in the case that there are plural black bits in specified image data, it is defined that there is a connection relationship therebetween when there is at least one of the above-mentioned positional relationship. Namely, if specified image data SD2 of one byte is "11011101", and adjacent image data AD3 of one byte is "10001111", it is defined that there is a connection relationship between the specified image data SD2 of one byte and the adjacent image data AD3.

When there is a connection relationship between adjacent two image data of one byte, there are stored connection relationship data of one in the connection table memory 28. On the other hand, when there is not any connection relationship between adjacent two image data of one byte, there are stored connection relationship data of zero therein.

(2-2) Scan process of connection relationship in longitudinal direction

In the scan process of the connection relationship in the longitudinal direction, first of all, one image data of one byte including at least one black bit are referred as specified image data of one byte, it is judged using the connection table stored in the connection table memory 28 whether or not the specified image data of one byte are connected to adjacent image data of one byte located on the lower side thereof by one in the image of two dimension. If there is a connection relationship therebetween, the adjacent image data of one byte is referred as the newly specified image data, and then, it is judged whether or not the newly specified image data of one byte is connected to the adjacent image data of one byte located on the lower side of the specified image data by one. The above-mentioned process is repeated until the updated specified image data of one byte is no longer connected to an adjacent image data of one byte, and then, the number of image data of one byte or the number of the bytes (referred to as a connection byte number hereinafter) are counted from the first specified image data of one byte to the last image data of one byte which are connected in the longitudinal direction.

The scan process of the connection relationship downward is described above. The scan process of the connection relationship upward is executed in a manner similar to that of the scan process of the connection relationship downward.

As shown in FIG. 2, the coordinate in the longitudinal direction of the first specified image data of one byte is referred to as a top coordinate, and the coordinate in the longitudinal direction of the last specified image data of one byte is referred to as a bottom coordinate.

(2-3) Scan process of connection relationship in transverse direction

On the other hand, the scan process of the connection relationship in the transverse direction is executed as follows after counting the connection byte number in the longitudinal using the connection table.

There are calculated the logical products of respective bits on respective lines between the first specified image data of one byte and the last specified image data of one byte which are connected in the longitudinal direction, and then, the calculated logical products are referred to as histogram data. In the present preferred embodiment, since each black pixel is represented by a bit of zero and each white pixel is represented by a bit of one, the logical products thereof are calculated as the histogram data.

Thereafter, the calculated histogram data are scanned in the left and right direction from the bit position of a specified bit (a black bit) of the first specified image data, and the bits of the histogram data which are black bits connected continuously until a white bit is first met are defined as the bits having a connection relationship in the transverse direction. The leftmost position of the bits having the connection relationship is referred to as a leftmost coordinate thereof, and the rightmost position of the bits having the connection relationship is referred to as a rightmost coordinate thereof.

Namely, in the case of the image data shown in FIG. 2, the calculated histogram data representing the logical products are shown in FIG. 3. In FIG. 3, "*" denotes a position of a specified bit, and arrows 101 and 102 represent the scan direction from the specified bit. $x_{min}$ denotes the leftmost position of the bits having the connection relationship or the leftmost coordinate, and $x_{max}$ denotes the rightmost position thereof or the rightmost coordinate.

The top and bottom coordinates and the leftmost and rightmost coordinates which are obtained in the scan process of the connection relationship in the longitudinal direction and the process of the connection relationship in the transverse direction are determined as the coordinates of the character rectangles.

(3) Detailed description of process for determining coordinates of character rectangles In a practical image data, normally, the character rectangles are located on two image data of one byte adjacent to each other. Therefore, the above-mentioned fundamental scan process can not process the above-mentioned practical image data. The process for determining the coordinates of the character rectangles of the present preferred embodiment will be described below in detail with reference to the flowcharts shown in FIGS. 5a, 5b and 6a to 6c.

In the present preferred embodiment, a predetermined maximum n of the longitudinal length and a predetermined maximum m of the transverse width of each character rectangle to be determined are set at 128 and 128, respectively, wherein the maximums m and n are represented in the unit of the number of pixels.

In order to prevent loss of the processing time due to redetermining of the coordinates of the character rectangles which have been determined once, all the data of the black pixels located within each determined character rectangle are erased from the image buffer memory 23. If there is a sufficient memory amount of RAM, there is used a working buffer memory having the same memory amount as that of the image buffer memory 23 wherein the working buffer memory is provided for temporarily storing all the image data of the recognition area, and the above-mentioned erasing process can be executed.

However, in order to execute the above-mentioned erasing process even if there is not a sufficient memory amount of RAM, the divided image buffer memory 24 is used. In this case, the image data stored in the image buffer memory 23 are divided in the longitudinal direction into predetermined amount of image data, and the divided image data having the predetermined amount are transferred and stored into the divided image buffer memory 24. Thereafter, the process for determining the character rectangles and the above-mentioned erasing process for the image data stored in the divided image buffer memory 24 are executed.

When the width (bytes) in the transverse direction of the image buffer memory 23 is x, it is necessary to provide the divided image buffer memory 24 having the following memory amount Md:

$$Md = (n+\alpha) \times x \text{ (bytes)} \tag{1}$$

where $\alpha$ is a predetermined number of the pixels. In the present preferred embodiment, the predetermined number $\alpha$ of pixels is set at 64.

Figure 4:
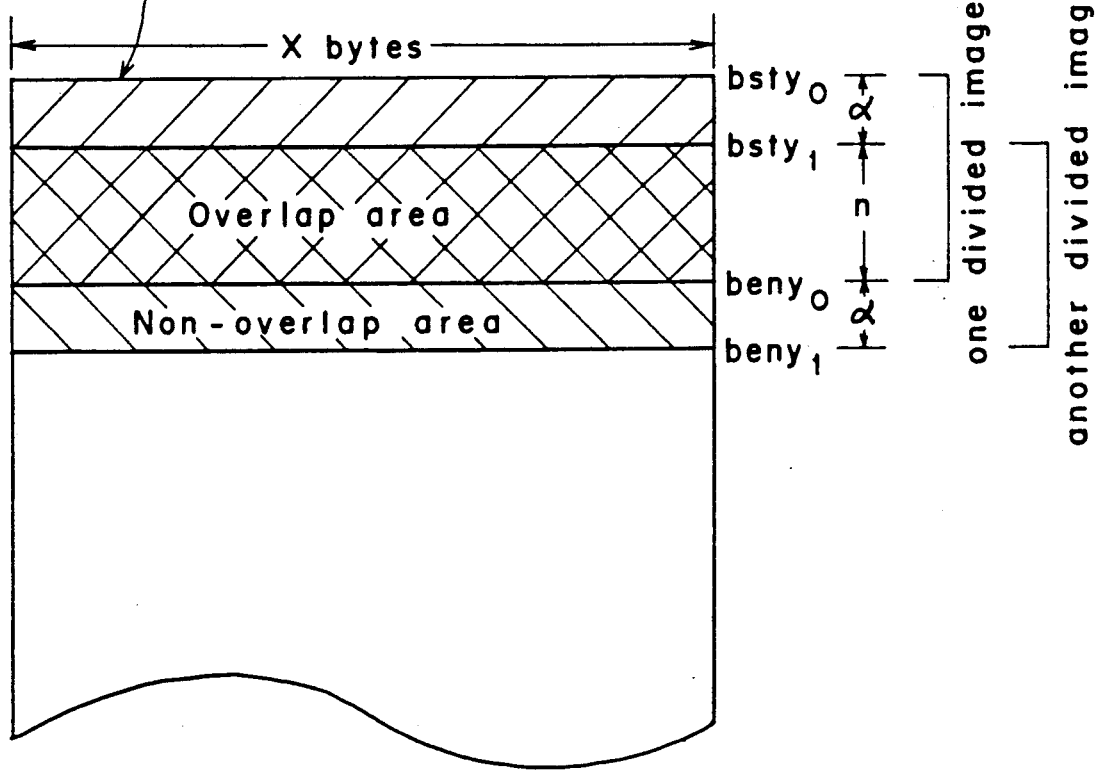
FIG. 4 is a memory map of an image buffer memory showing a division process of image data stored in the image buffer memory shown in FIG. 1.

Further, in order to determine the coordinates of the character rectangles which are located on the boundaries between the divided image data, the divided image data are transferred and stored into the divided buffer memory 24 so as to cause an overlap area between two divided image data adjacent to each other in the longitudinal direction as shown in FIG. 4. In this case, the longitudinal length of the overlap area of the image data is set at the maximum n of the longitudinal length. Furthermore, since the process for determining the coordinates of the character rectangles and the above-mentioned erasing process have been completed for the image data located in the overlap area after once executing the process for determining the coordinates of the character rectangles, in practice, when the image data stored in the overlap area of the divided image buffer memory 24 are transferred and stored into a predetermined area of the same memory 24, the image data stored in a non-overlap area thereof are transferred and stored from the image buffer memory 23 into the divide image buffer memory 24.

(3-1) Management of divided image buffer memory and scan process of specified image data The management of the divided image buffer memory 24 and the scan process of the specified image data will be described below with reference to a main routine thereof shown in FIGS. 5a and 5b.

Figure 5A:
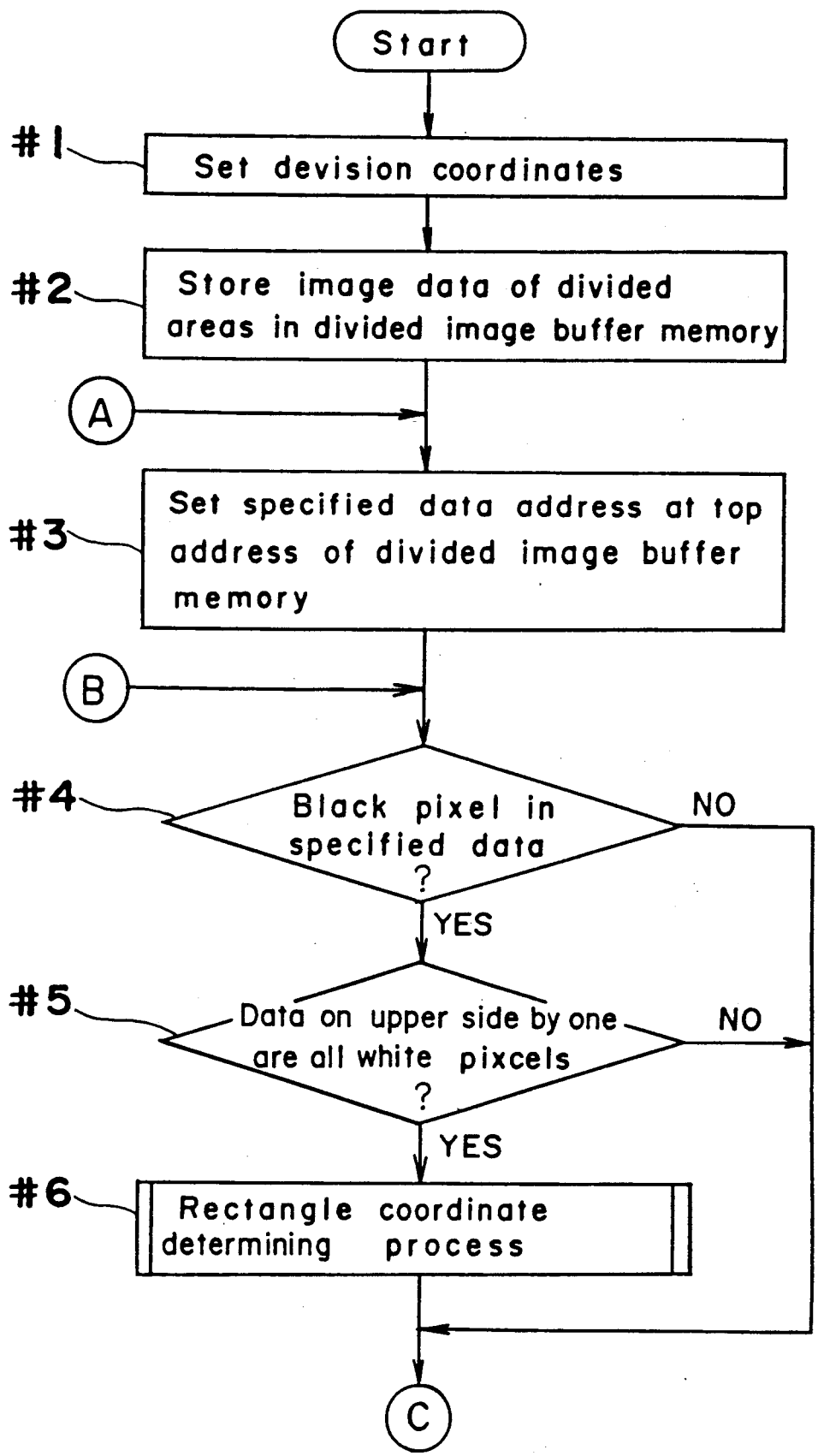
FIGS. 5a and 5b are flowcharts showing a main routine of a process for determining coordinates of character rectangles in a recognition area.
Figure 5B:
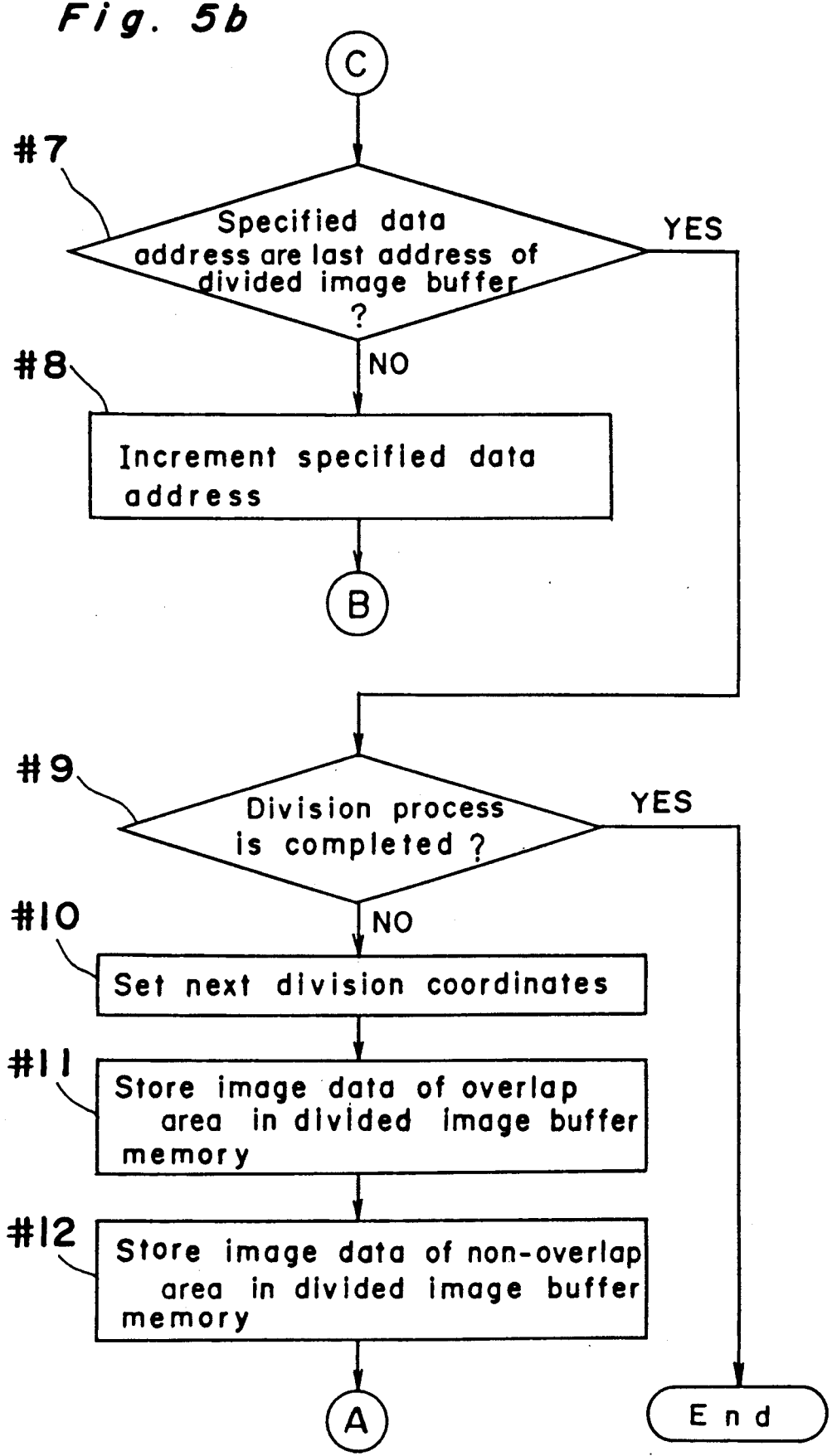

Referring to FIG. 5a, there are set at step #1 a division start coordinate $bsty_i$ and a division end coordinate $beny_i$, ($i=1, 2, \ldots, n_d$) in the longitudinal direction, where $n_d$ is a number of partitions, and is set according to the longitudinal length (bytes) of the image buffer memory 23 and the longitudinal length (bytes) of the divided image buffer memory 24.

First of all, the initial values $bsty_0$ and $beny_0$ of the division start coordinate $bsty_i$ and the division end coordinate $beny_i$ are set at step #1 as follows.

$$bsty_0 = 0 \tag{2}$$

$$beny_0 = n + \alpha \tag{3}$$

Thereafter, the divided image data stored in a divided area of the image buffer memory 23 which is designated by the division start coordinate $bsty_i$ and the division end coordinate $beny_i$ are transferred and stored into the divided image buffer memory 24 at step #2.

Thereafter, the address of the first specified image data of one byte are set as the top address of the divided image buffer memory 24 at step #3.

Thereafter, it is judged whether or not there is a black bit of zero in the specified image data at step #4. If all the bits of the specified image data are the white bits of one (No at step #4), the program flow goes to step #7. On the other hand, if there is at least one black bit of zero in the specified image data (Yes at step #4), the program flow goes to step #5, and then, it is judged whether or not all the bits of the image data of one byte located on the upper side of the specified image data by one in all the image data of two dimension are the white bits.

If there is at least one black bit in the upper image data of one byte (No at step #5), the program flow goes to step #7. On the other hand, all the bits of the upper image data of one byte is the white bits (Yes at step #5), the coordinates of the character rectangle are determined based on the present specified image data at step #6 in the process of a subroutine shown in FIGS. 6a to 6c.

After executing the process for determining the coordinates of the character rectangle at step #6, the program flow goes to step #7, and then, it is judged whether or not the address of the present specified image data of one byte is the last address of the divided image buffer memory 24. If it is not the last address thereof (No at step #7), the program flow goes to step #8, and then, the address of the specified image data of one byte is incremented. Thereafter, the program flow goes back to step #4. On the other hand, the address of the present specified image data of one byte is the last address of the divided image buffer memory 24 (Yes at step #7), the program flow goes to step #9, and then, it is judged whether or not the division process is completed.

If the division process is completed (Yes at step #9), the main routine is finished. Otherwise (No at step #9), the program flow goes to step #10, and then, there are set the next division start coordinate $bsty_1$ and the next division end coordinate $beny_1$ represented by the following equations (4) and (5).

$$bsty_1 = bsty_0 + \alpha \quad (4)$$

$$beny_1 = beny_0 + \alpha \quad (5)$$

As shown in FIG. 4, the addresses between the coordinates $bsty_1$ and $beny_0$ are the overlap area where one divided image data and another divided image data are overlapped, and the image data stored therein have been already processed. Therefore, the image data stored in the overlap area are transferred and stored from the present addresses of the divided image buffer memory 24 through a working RAM 22 into the newly assigned addresses thereof at step #11, and then, the image data of the non-overlap area stored at the addresses $beny_0$ to $beny_1$ of the image buffer memory 23 are transferred and stored from the image buffer memory 23 into the divided image buffer memory 24. Thereafter, the program flow goes back to step #3.

Thereafter, the above process for dividing the image data and transferring them is repeated so as to determine the coordinates of the character rectangles from all the image data stored in the image buffer memory 23.

In the process for determining the coordinates of the character rectangles at step #6, the character rectangles located on both sides of the boundary between one divided image data and another divided image data, or both of one divided image data and another divided image data have not been processed because of the reason described in detail later. Therefore, the character rectangles are connected.

(3-2) Rectangle coordinate determining process

Figure 6A:
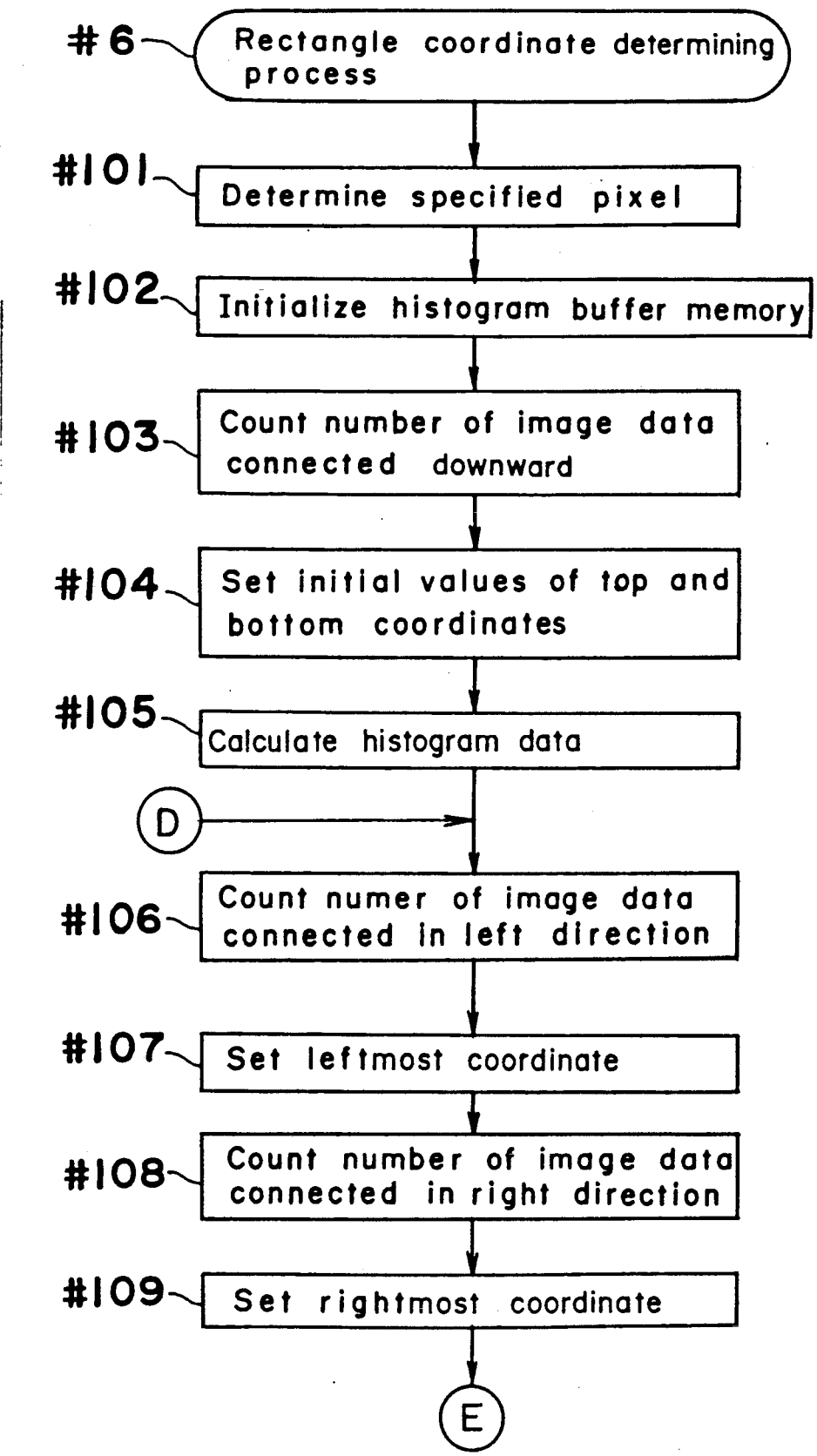
FIGS. 6a to 6c are flowcharts showing a subroutine of a rectangle coordinates determining process.
Figure 6B:
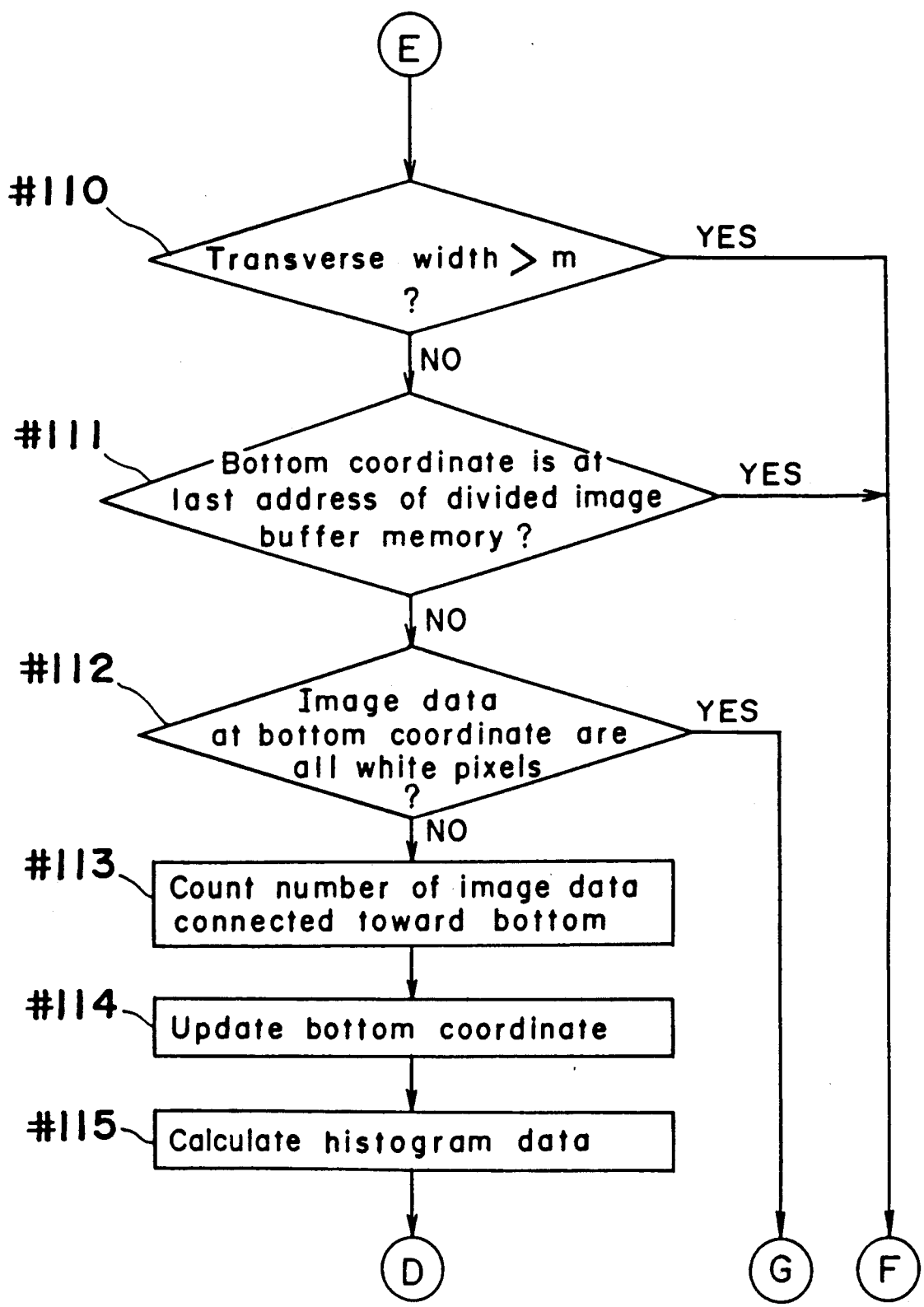
Figure 6C:
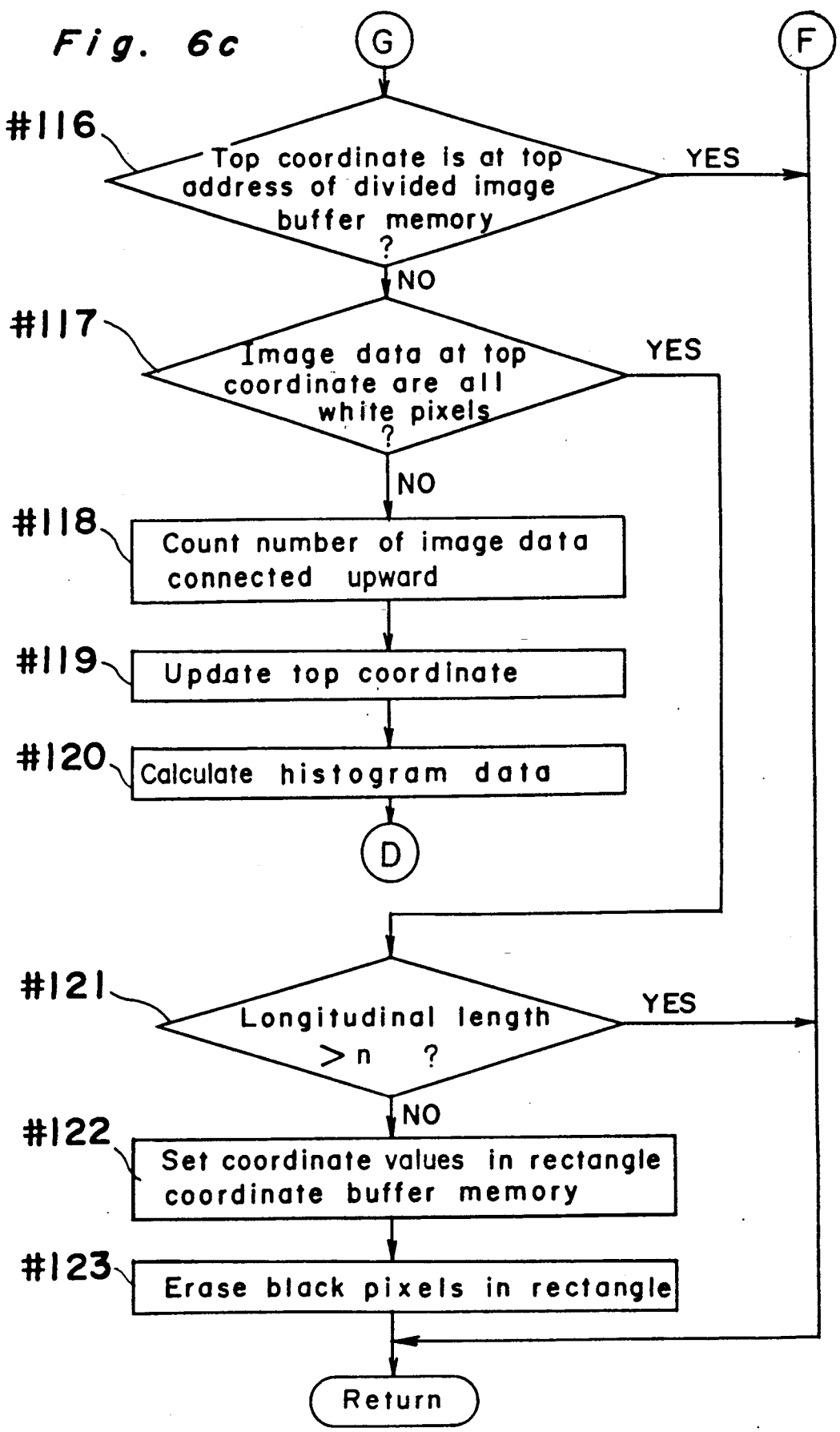

FIGS. 6a to 6c are flowcharts showing the rectangle coordinate determining process of step #6 shown in FIG. 5a. The rectangle coordinate determining process will be described below with reference to the flowcharts shown in FIGS. 6a to 6c.

After determining specified image data of one byte at the processes from step #1 to step #5 shown in FIG. 5a, a specified bit of one pixel is determined among all the bits of the specified image data of one byte at step #101. The specified bit determined at step #101 corresponds to the specified bit * shown in FIG. 3, and the leftmost and rightmost coordinates are searched referring to the position of the specified bit as the center of the search.

Thereafter, after the histogram buffer memory 26 is initialized so that all data thereof are set at one at step #102, the program flow goes to step #103, and then, the above-mentioned connection byte number $\beta$ from the specified image data downward is counted at step #103. The reason why the connection byte number only downward is counted is that it is secured that all the image data located on the upper side of the specified image data are the white bits. The process of step #103 is executed in a manner similar to that of the scan process of the connection relationship in the longitudinal direction which is described above in the description of the fundamental process.

Thereafter, the initial values of the top coordinate $y_{min}$ and the bottom coordinate $y_{max}$ are set at step #104 based on the connection byte number $\beta$ counted at step #103 as follows.

$$y_{min} = y_1 \quad (6)$$

$$y_{max} = y_1 + \beta \quad (7)$$

where $y_1$ is the coordinate in the longitudinal direction of the specified image data of one byte which are located in all the image data of two dimension.

Thereafter, there are calculated at step #105 the histogram data of the logical products of respective bits in the transverse direction from the top coordinate $y_{min}$ and the bottom coordinate $y_{max}$. The range in the longitudinal direction in all the image data of two dimension to be processed in order to calculate the histogram data is located from the top coordinate $y_{min}$ to the bottom coordinate $y_{max}$, and the range in the transverse direction is located between a position of the left side of the specified image data by half the transverse width of h bytes and a position of the right side thereof. The transverse width of h bytes is given by the following equations (8a) and (8b).

For the case that m is not a multiple of eight, $$h = \frac{m}{8} + 1, \quad (8a)$$

and, for the case that m is a multiple of eight, $$h = \frac{m}{8} \quad (8b)$$

where m is the maximum of the transverse width of a character rectangle as described above.

FIG. 7 shows one example of an area 61 of the image data to be processed in order to calculate the histogram data. In FIG. 7, each rectangle denotes image data of one byte, and * denotes specified image data of one byte. In this case shown in FIG. 7, the maximum m of the transverse width is set at 64. Therefore, half the transverse width of h bytes is eight bytes.

Figure 8:
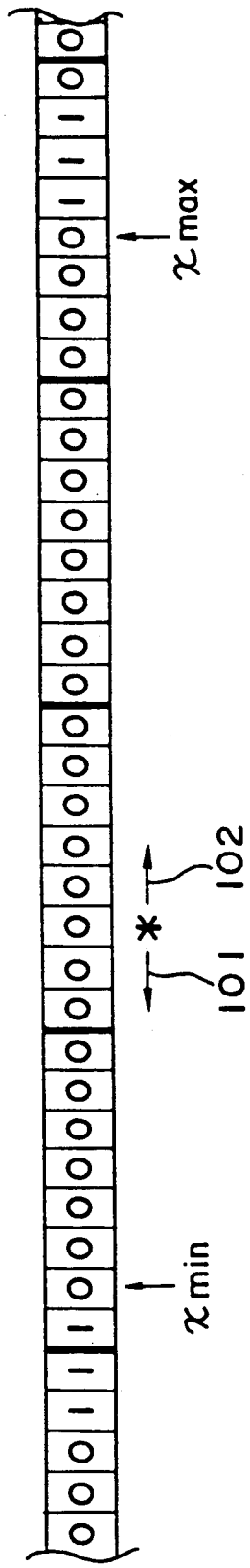
FIG. 8 is a schematic diagram showing histogram data and leftmost and rightmost coordinates.

FIG. 8 shows the histogram data of the area 61 of the image data.

There is counted at step #106 a bit number $c_{left}$ of black bits (referred to as a connection bit number hereinafter) which are continuously connected in the left direction as indicated by the arrow 101 from the position of the specified bit *, and then, the leftmost coordinate $x_{min}$ or the leftmost position of bits having the connection relationship in the left direction is calculated at step #107 according to the following equation (9).

$$x_{min} = x_1 - c_{left} \quad (9)$$

Similarly, there is counted at step #108 a connection bit number $c_{right}$ which are continuously connected in the right direction as indicated by the arrow 102 from the position of the specified bit *, and then, the rightmost coordinate $x_{max}$ or the rightmost position of bits having the connection relationship in the right direction is calculated at step #109 according to the following equation (10).

$$x_{max} = x_1 + c_{right} \qquad (10)$$

After calculating the leftmost and rightmost coordinates $x_{min}$ and $x_{max}$, the program flow goes to step #110 of FIG. 6b, and then, it is judged whether or not the transverse width $(x_{max} - x_{min} + 1)$ of the determined character rectangle is larger than the maximum m thereof.

If the transverse width $(x_{max} - x_{min} + 1)$ is larger than the maximum m thereof (Yes at step #110), this process is finished, and then, program flow returns to the main routine. Otherwise (No at step #110), the program flow goes to step #111.

It is judged at step #111 whether or not the bottom coordinate $y_{min}$ is located on the boundary between adjacent divided image data. If the bottom coordinate $y_{min}$ is located on the boundary between adjacent two divided image data (Yes at step #111), this process is finished, and then, the program flow returns to the main routine. Otherwise (No at step #111), the program flow goes to step #112, and then, it is judged whether or not all the bits of the image data located on the coordinate $(y_{max} + 1)$ in the longitudinal direction are the white bits by scanning them in the range from the leftmost coordinate $x_{min}$ to the rightmost coordinate $x_{max}$.

Figure 9:
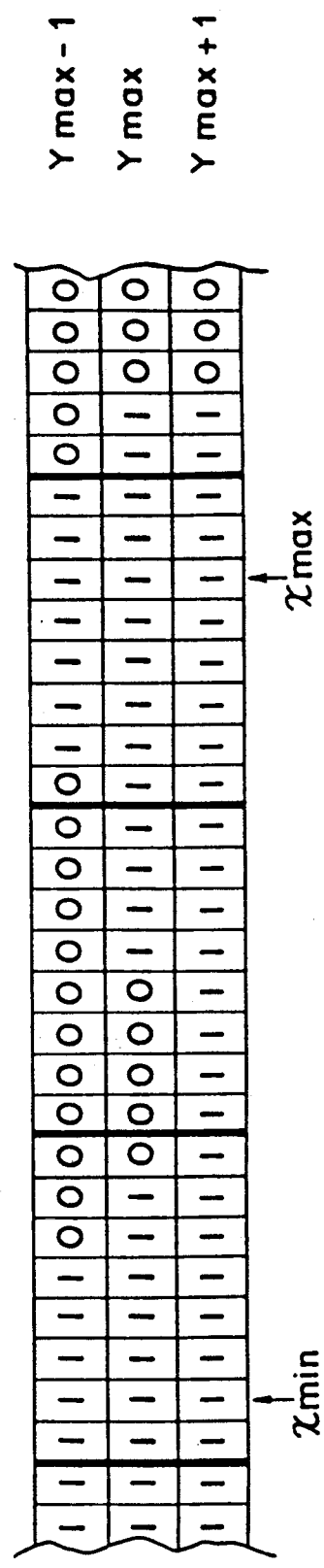
FIG. 9 is a schematic diagram of image data showing a scan area of white pixels stored in divided image buffer memory.

If all the bits of image data located on the coordinate $(y_{max} + 1)$ are the white bits (Yes at step #112) as shown in FIG. 9, the program flow goes to step #116 of FIG. 6c. On the other hand, if there is at least one black bit in the image data of the above range (No at step #112), the program flow goes to step #113. Then, the image data of one byte including the black bit or bits are referred as a newly specified image data of one byte, and there is counted the connection byte number $\gamma$ of image data having a connection relationship downward from the newly specified image data of one byte. Thereafter, the bottom coordinate $y_{max}$ is updated at step #114 according to the following equation (11).

$$y_{max} \leftarrow y_{max} + \gamma \qquad (11)$$

Thereafter, there are calculated at step #115 the histogram data of the logical products of respective bits in the transverse direction from the image data of an area indicated by the newly calculated top and bottom coordinates $y_{max}$ and $y_{min}$, and then, the program flow goes back to step #106 of FIG. 6a.

The process from step #116 to #120 of the scan process with respect to the image data located on the upper side of the specified image data of one byte is executed in a manner similar to that of process from step #111 to step #115.

If all the bits of the image data located on the coordinate $(y_{min} - 1)$ in the range from the leftmost coordinate $x_{min}$ to the rightmost $x_{max}$ are the white bits (Yes at step #117), the program flow goes to step #121, and then, it is judged whether or not the transverse width $(y_{max} - y_{min} + 1)$ of the determined character rectangle is larger than the maximum n of the longitudinal width thereof.

If the longitudinal width $(y_{max} - y_{min} + 1)$ is larger than the maximum m thereof (Yes at step #121), this process is finished, and then, the program flow returns to the main routine. Otherwise (No at step #121), the top and bottom coordinates $y_{min}$ and $y_{max}$ and the leftmost and rightmost coordinates $x_{min}$ and $x_{max}$ which have been determined at this process are stored in the rectangle coordinate buffer memory 25 at step #122, and then, all the black bits of the image data located within the specified character rectangle are erased to be set at the white bit of one at step #123 in order to prevent the rectangle coordinate determining process for the same character rectangle again from being executed. Thereafter, the program flow returns to the main routine.

FIG. 10 shows character rectangles obtained by the method of the present preferred embodiment.

For example, in the rectangle coordinate determining process for an area of divided image data, if the determined bottom coordinate is the last address of the divided image buffer memory 24 (Yes at step #111), the program flow returns to the main routine without updating the bottom coordinate thereof. Therefore, at the beginning of the process for the next area of the divided image data, since the to coordinate which has been determined in the process of the former divided image data is stored in the rectangle coordinate buffer memory 25, the data thereof are kept therein. Therefore, even though a character rectangle is located in both of the areas of the divide image data adjacent in the longitudinal direction, the top and bottom coordinates thereof can be determined correctly.

According to the method for determining the coordinates of the character rectangles of the preferred embodiment according to the present invention, the process therefor can be executed at a sufficiently practical processing speed even though a CPU provided for a general use having a relatively low performance is used. Further, since the coordinates of the character rectangles are determined from original image data, it can be prevented that it is judged that unconnected black pixels close to each other have a connection relationship of each other as well as the conventional examples. As a result, the coordinates of the character rectangles close to a character rectangle can be determined more correctly.

The process of the present preferred embodiment can be executed at a speed higher than that of the conventional process using the method for labeling the connected black pixels. The present invention can be easily applied to plural image data each of which is composed of multi-value data, and the present invention can be applied to image processing apparatuses such as a facsimile apparatus or an electronic filing system.

In the scan process of the connection relationship in the transverse direction of the present preferred embodiment, the logical products of respective bits on respective lines between the first specified image data of one byte and the last specified image data of one byte which are connected in the longitudinal direction are calculated as the histogram data since each black pixel is represented by a bit of zero and each white pixel is represented by a bit of one. However, the present invention is not limited to this. In the case that each black pixel is represented by a bit of one and each white pixel is represented by a bit of zero, the logical sums of respective bits on respective lines between the first specified image data of one byte and the last specified image data of one byte which are connected in the longitudinal direction may be calculated as the histogram data.

In the present preferred embodiment, m is set at the maximum of the transverse width of each character rectangle, however, the present invention is not limited to this. m may be set at a value equal to or larger than the maximum of the transverse width of each character rectangle.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A method for determining coordinates of a circumscribed rectangular frame for enclosing each character based on image data of character images in a recognition area having been read by an image scanner, including:

a first step of determining specified image data of a predetermined data unit in a transverse direction parallel to lines including at least one bit of black pixel by scanning said read image data, and for determining a specified bit being one bit of black pixel in said specified image data;

a second step for judging whether a bit of black pixel is in either the bit located by one bit at the upper side of said specified bit of said specified image data which has been determined at said first step, or the bits located in said transverse direction by one bit of the bit located at the upper side by one bit of said specified bit of said specified image data;

a third step for determining the bit of black pixel as a newly specified bit if there is the bit of black pixel therein and for repeating said second step, otherwise the coordinate in the transverse direction of said specified bit of black pixel being determined as a top coordinate of said circumscribed rectangular frame;

a fourth step for judging whether a bit of black pixel is in either the bit located by one bit at the lower side of said specified bit of said specified image data which has been determined at said first step, or the bits located in said transverse direction by one bit of the bit located at the lower side by one bit of said specified bit of said specified image data;

a fifth step for determining the bit of black pixel as a newly specified bit if there is the bit of black pixel therein and for repeating said fourth step, otherwise the coordinate in the transverse direction of said specified bit of black pixel being determined as a bottom coordinate of said circumscribed rectangular frame;

a sixth step of calculating histogram data composed of either logical products or logical sums of respective bits in said transverse direction from plural image data located in a specified area between said determined top and bottom coordinates in a predetermined threshold range in said transverse direction from the center of said specified image data which is equal to or larger than the maximum of the transverse width of each circumscribed rectangular frame;

a seventh step of determining a coordinate in said transverse direction of a bit of black pixel located at the leftmost position in said calculated histogram data as a leftmost coordinate of said circumscribed rectangular frame; and an eighth step of determining a coordinate in said transverse direction of a bit of black pixel located at the rightmost position in said calculated histogram data as a rightmost coordinate of said circumscribed rectangular frame.

2. The method as claimed in claim 1, further including a ninth step for judging said determined top and bottom coordinates and said determined leftmost and rightmost coordinates as coordinates of said circumscribed rectangular frame for enclosing each character when a difference between said determined top and bottom coordinates is equal to or smaller than a predetermined first threshold value and a difference between said determined leftmost and rightmost coordinates is equal to or smaller than a predetermined second threshold value after executing said eighth step.

3. The method as claimed in claim 2, further including:

a step of dividing said read image data into plural divided image data having predetermined data amount in said transverse direction so that said divided image data include image data overlapped with former divided image data adjacent thereto before executing said first step; and a step of erasing bits of black pixel in said image data located within said determined circumscribed rectangular frame so as to set them at white pixels after executing said ninth step.

4. The method as claimed in claim 1, wherein histogram data is calculated only from logical products or logical sums of respective bits in the transverse direction.

* * * * *